United States Patent
Nishioka et al.

[11] Patent Number: 5,346,869
[45] Date of Patent: Sep. 13, 1994

[54] SINTERED SILICON NITRIDE BODIES SUITABLE FOR USE AS HIGH IMPACT MATERIALS

[75] Inventors: Takao Nishioka; Takehisa Yamamoto; Kenji Matsunuma; Akira Yamakawa; Masaya Miyake, all of Itami, Japan

[73] Assignee: Sumitomo Electric Industries, Ltd., Japan

[21] Appl. No.: 175,490

[22] Filed: Dec. 29, 1993

Related U.S. Application Data

[63] Continuation of Ser. No. 11,096, Jan. 26, 1993, abandoned, which is a continuation of Ser. No. 823,976, Jan. 22, 1992, abandoned.

[30] Foreign Application Priority Data

Jun. 26, 1991 [JP] Japan .................................. 3-154547

[51] Int. Cl.$^5$ .............................................. C04B 35/58
[52] U.S. Cl. .................................. 501/98; 501/96; 501/97; 501/118; 501/122; 501/128; 501/152; 501/153
[58] Field of Search ................ 501/94, 96, 97, 98, 501/122, 152, 118, 128, 153

[56] References Cited

U.S. PATENT DOCUMENTS

| | | | |
|---|---|---|---|
| 4,412,009 | 10/1983 | Kosmatsu et al. | 501/98 |
| 4,600,182 | 7/1986 | Veltri et al. | 266/286 |
| 4,640,903 | 2/1987 | Matsuhiro et al. | 501/97 |
| 4,652,276 | 3/1987 | Burden | 51/308 |
| 4,777,822 | 10/1988 | Uemura et al. | 72/366 |
| 4,883,776 | 11/1989 | Pyzik et al. | 501/10 |
| 4,892,848 | 1/1990 | Yoshida et al. | 264/65 |
| 4,904,624 | 2/1990 | Yeckley | 501/97 |
| 5,002,907 | 3/1991 | Hayakawa et al. | 501/98 |
| 5,015,608 | 5/1991 | Matsuhisa et al. | 501/97 |
| 5,017,531 | 5/1991 | Ukai et al. | 501/98 |

OTHER PUBLICATIONS

Chemical Abstracts vol. 114, No. 24; Jun. 17, 1991 Abstract 233516K.

*Primary Examiner*—Anthony Green
*Assistant Examiner*—Michael Marcheschi
*Attorney, Agent, or Firm*—Jordan B. Bierman

[57] ABSTRACT

Described are sintered silicon nitride bodies useful as materials for parts required to have strength, especially excellent impact strength for items such as automobile parts and machine parts. The sintered $Si_3N_4$ bodies contain 80–98 wt. % of silicon nitride and have a porosity not higher than 3% and an shock compressive elasticity limit of at least 15 GPa.

1 Claim, 2 Drawing Sheets

SINTERED SILICON NITRIDE BODIES SUITABLE FOR USE AS HIGH IMPACT MATERIALS

This application is a continuation of application Ser. No. 08/011,096, filed Jan. 26, 1993, now abandoned which is a continuation of application Ser. No. 07/823,976, filed Jan. 22, 1992, now abandoned.

BACKGROUND OF THE INVENTION

1. Field of the Invention

This invention relates to sintered silicon nitride bodies useful as materials for parts required to have strength, especially excellent impact strength for items such as automobile parts and machine parts.

2. Description of the Related Art

There has been rapid progress in recent years in developments toward improved fuel consumption in the automobile-related field to cope with the global environmental problems of $CO_2$, $SO_x$ and $NO_x$ and the like. With a view toward enhancing efficiency by reducing weight, friction loss or the like, there has been interest in using a ceramic material as a valve system material. Silicon nitride materials in particular are most promising candidates for their light weight, high strength, high toughness and high Young's modulus. For actual use, these silicon nitride materials are, however, still not fully satisfactory in mechanical properties such as strength and toughness. Examples of the applications of ceramic materials to such automobile parts include an impeller for a turbocharger [Shibata, Hattori and Kawamura, "Niyu Seramikusu (New Ceramics)" 1, p 91 (1988)] and a tappet shim for a diesel engine [Hara, Kobayashi, Matsui and Akabane, "Jidosha Gijutsu (Automobile Technology)", 45(4), p. 33 (1991)]. These examples both make use of the characteristic light weight and high abrasion resistance of silicon nitride ceramics, but their strength is as low as 100 kg/mm² in terms of 3-point bending strength as measured in accordance with JIS R1601. These materials are not considered to have sufficient strength to be usable for valve systems or mechanical parts, especially in the area of impact strength where they have a potential problem in reliability. Especially, parts such as tappet shims referred to above, when employed in a conventional reciprocating engine, must have high impact resistance as they are subjected to very high impact stress in a non-steady operation state (for example, during surging), to say nothing of abrasion resistance. For the use in such parts, there has been a strong demand for of a high strength silicon nitride material having a superior impact resistance.

SUMMARY OF THE INVENTION

An object of this invention is to provide a high-strength silicon nitride material excellent in impact resistance.

The present inventors have found that fulfillment of the following two conditions is indispensable to attain the above object:

(1) From the standpoints of the texture and composition of the material, the content of silicon nitride and the porosity must fall within specific ranges.

(2) In view of physical properties of the material, the shock compressive elasticity limit [Hugoniot-elastic limit (HEL)] must fall within a particular range.

In accordance with the present invention, there is provided a sintered silicon nitride body suitable for use as a high impact material, which comprises 80–98 wt. % of silicon nitride and has a porosity not higher than 3% and an shock compressive elasticity limit [Hugoniot-elastic limit (HEL)] of at least 15 GPa.

Sintered silicon nitride bodies according to the present invention are excellent especially in impact resistant property, to say nothing of superb static strength. They are hence applicable as valve system materials and machine parts such as cam followers and exhaust valves of reciprocal engines.

DETAILED DESCRIPTION OF THE PREFERRED EMBODIMENT

Figure 1:
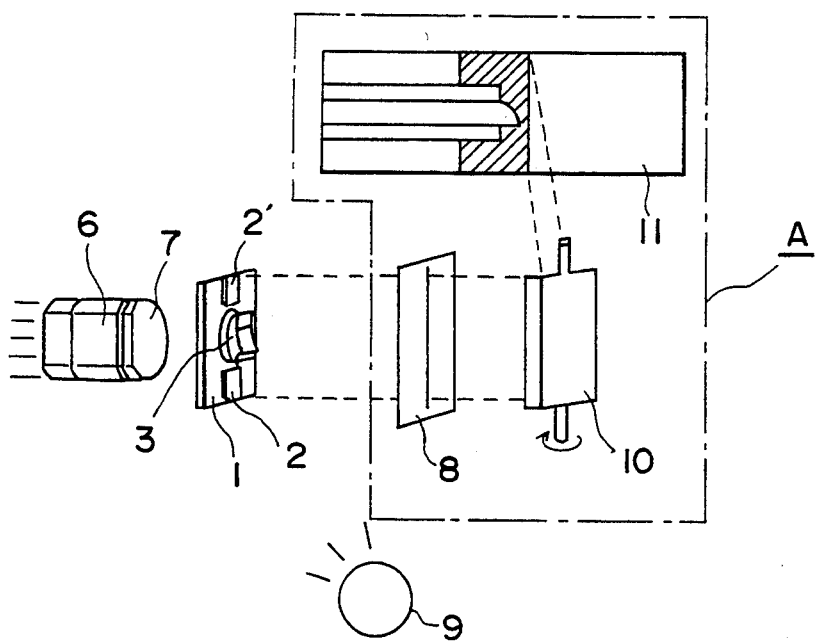
FIG. 1 shows a measuring method of an shock compressive elasticity limit [Hugoniot-elastic limit (HEL)] in the present invention.

The sintered silicon nitride body of the present invention is composed principally of either one or both of silicon nitride and sialon. The content of these constituents should be in the range of 80 wt. % to 98 wt. %. This range has been determined based on the following finding. Namely, contents lower than 80 wt. % lead to reduced impact resistance because grain boundary phase component or components are contained at a high concentration. On the other hand, contents in excess of 98 wt. % result in lowered sinterability and, unless a high-pressure sintering process (e.g., hot pressing) is used, lead to sintered bodies containing many pores and hence induce a reduction in impact resistance.

Turning to the porosity of a sintered body, it has been found that porosities higher than 3% result in a marked reduction in shock compressive elasticity limit [Hugoniot-elastic limit (HEL)] and hence lead to lowered impact resistance.

The-strength characteristics of silicon nitride materials are affected by many factors such as the composition and relative density of the sintering aid, the grain size and grain shape (aspect ratio and the like) of silicon nitride crystal grains, etc. particular, nothing has been determined for certainty with respect to factors which govern the impact resistance. This is believed to be responsible for the fact that no reliability has yet been attained in the application of such silicon nitride materials. As a result of extensive research conducted by the present inventors, it has been ascertained that evaluation results obtained by various conventional impact testing methods (Charpy, Izod, and drop weight testing methods) do not fully conform with those obtained from practical impact property tests (for example, motoring test), the shock compressive elasticity limit [Hugoniot-elastic limit (HEL)] of a ceramic material containing a silicon nitride material is effective as a value for the evaluation of the impact resistance of the ceramic material and silicon nitride materials having an shock compressive elasticity limit [Hugoniot-elastic limit (HEL)] of 15 GPa or higher are excellent especially in impact resistance.

A measuring method of the shock compressive elasticity limit is well-known and its details are described, for example, in the following publications:

(1) "Shogeki Kogaku (Impact Engineering)", chapter 8, page 227, The Nikkan Kogyo Shimbunsha (1988).
(2) T. Mashimo, M. Kodama and K. Hagayama: "Elastoplastic Property under Shock Compression of CaO-Doped Stabilized Zirconia Ceramics", Proc. 3rd Internat.-Conf. Sci. Tech. Zirconia.

The present invention will hereinafter be described specifically by the following examples.

EXAMPLE 1

After 92 wt. % of commercial silicon nitride powder (percentage a crystallization: 95%; average particle size: 0.5 pm) were wet-mixed with 5 wt. % of yttrium oxide powder, 2 wt. % of aluminum oxide powder and 1 wt. % of magnesium oxide powder, all as sintering aids, in ethanol for 100 hours in a nylon-made ball mill, the resulting slurry was subjected to sifting through a 20 μm nylon mesh. The mixed powder so sifted was dried at 90° C. for 2 hours. The powder so dried was shifted through 250 μm nylon mesh, followed by CIP (cold isostatic pressing) molding under the pressure of 3000 kg/cm$^2$.

Green compacts formed as described above were sintered under various conditions to obtain sintered bodies, respectively. As specimens for measuring the shock compressive elasticity limits (Hugoniot-elastic limits) of those sintered bodies, test pieces of 19 mm × 19 mm × 5 mm were cut out from the sintered bodies, respectively. All the surfaces of those test pieces were then finished by a #800 diamond wheel.

To determine practical properties, on the other hand, disk-shaped test pieces having a diameter of 25 mm × 3 mm were also cut out from the sintered bodies, respectively. Both the upper and lower surfaces of each test piece were also finished by the #800 grinding diamond wheel, while the circumferential edge of the test piece was beveled at a curvature of radius of 0.3 mm to form a cam follower.

In addition, from each of the sintered bodies, bending specimens were also cut out following JIS R1601. They were subjected to the 3-point bending strength test.

Figure 2:
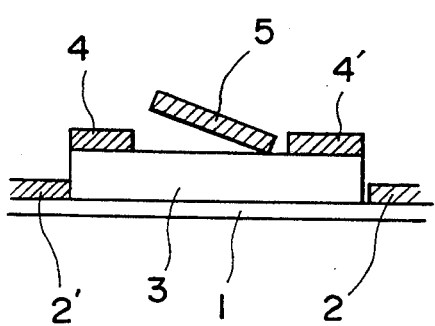
FIG. 2 is an enlarged view of a specimen-mounting part of the measuring apparatus shown in FIG. 1.

The shock compressive elasticity limits [Hugoniot-elastic limits (HEL)] were measured in accordance with the inclined-mirror method illustrated in FIG. 1. FIG. 2 is an enlarged view of a specimen-mounting part of the testing apparatus shown in FIG. 1.

According to this measuring method, two plane mirror 2,2' were mounted on a driver plate I whereas an additional plane mirror 4,4' and an inclined mirror 5 were arranged on the front side of a specimen 3, respectively. When a shock wave from projectile 6 had reached the back side of the specimen 3 via the driver plate 1 or a free surface of the specimen I had been brought into collision against the inclined mirror 5, the mirror-mounted side of the driver plate 1 was shaken so that light reflected by each mirror was disturbed. This was recorded by a high-speed streak camera A through a slit 8. Reference numeral 7 in FIG. I represents a flyer plate. A xenon-flash lamp 9 was used as a light source, and a pulse signal from a logic circuit of a speed measuring instrument for the projectile 6 was used as a trigger for the xenon-flash lamp 9. A mirror-rotating type camera was used as the high-speed streak camera A. Reference numerals 10 and 11 represent a rotating mirror and a film, respectively.

Figure 3:
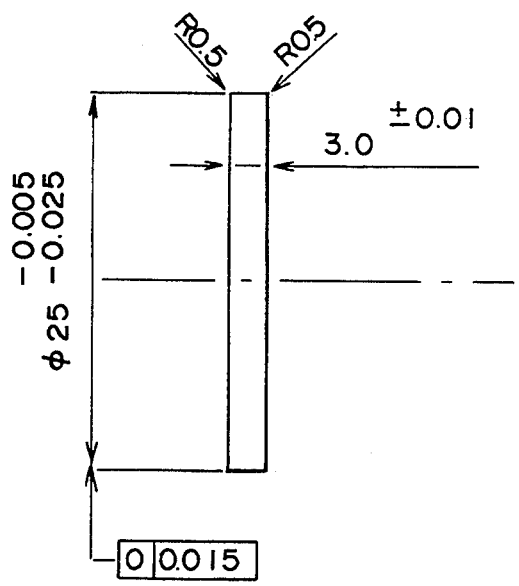
FIG. 3 is a side view of a completed cam follower product.
Figure 4:
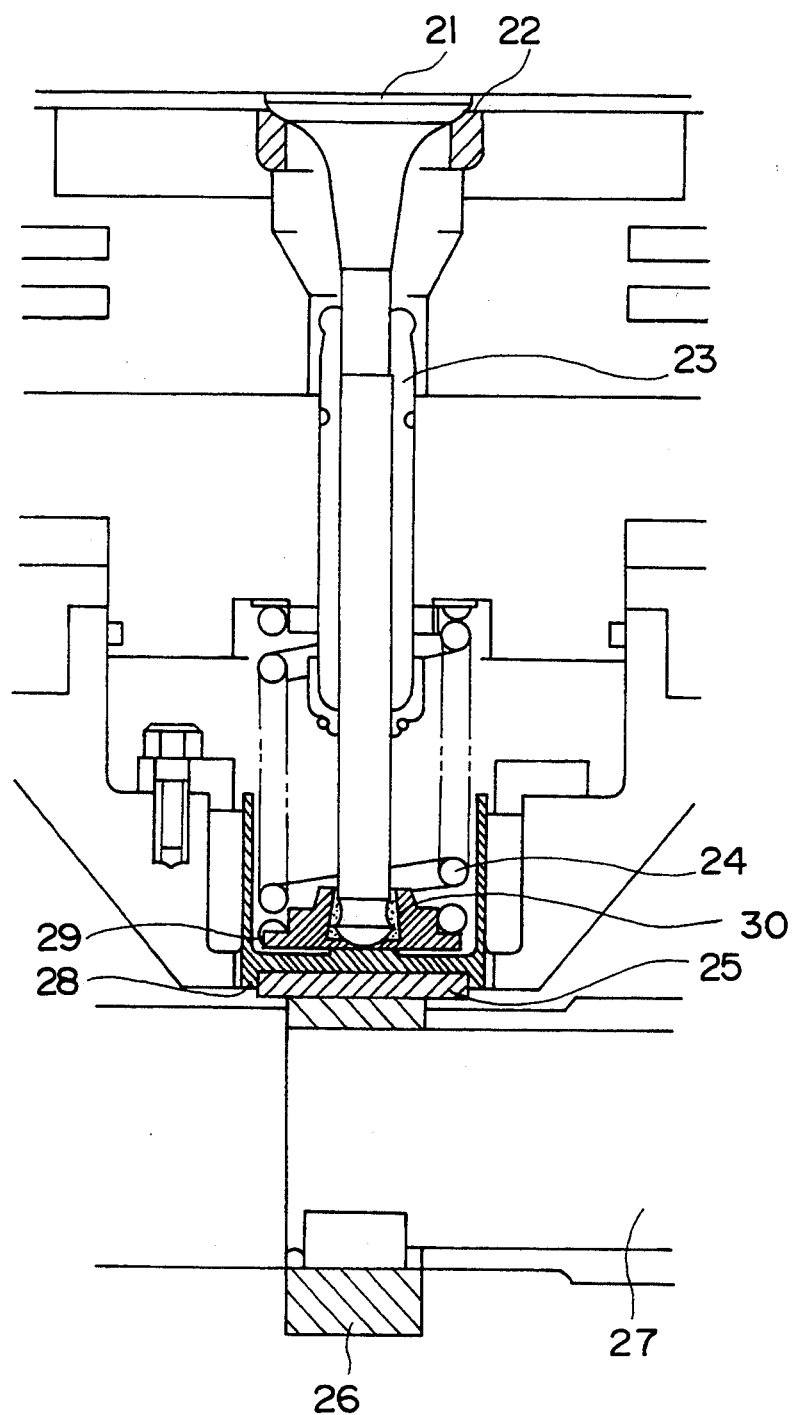
FIG. 4 is a vertical cross-section of a motoring machine for evaluating the breaking threshold of a cam follower.

FIG. 3 shows a completed cam follower product in which dimensions are shown in millimeter units. Each cam follower was evaluated in terms of breaking threshold based on the number of revolutions of a cam by a motoring machine depicted in FIG. 4. As is illustrated in FIG. 4, the motoring machine has a valve 21, a valve seat 22, a valve guide 23, a valve spring 24, a cam follower 25, a cam 26, a cam shaft 27, a valve lifter 28, a retainer 29 and a retainer lock 30. The direct drive system making use of the cam is adopted herein. Incidentally, the revolution number of an engine is equivalent to twice the revolution number of the cam.

The results of the above evaluation are summarized in Table 1. The porosity of each sintered body as determined from its specific gravity calculated from its composition and that measured by the Archimedes' method is also shown in the table.

TABLE 1

| Specimen No. | Porosity (%) | 3-point bending strength (kg/mm$^2$) | Hugoniot-elastic limit (HEL) (GPa) | Revolution number of cam follower breakage (rpm) |
| --- | --- | --- | --- | --- |
| 1 | 1.2 | 108 | 15.8 | 4300 |
| 2 | 0.8 | 138 | 18.5 | 4450 |
| 3 | 0.2 | 155 | 21.5 | Not broken |
| 4 | 3.5 | 102 | 11.2 | 4000 |
| 5 | 3.5 | 85 | 10.4 | 3950 |
| 6 | 1.5 | 96 | 14.5 | 4050 |

Note: Specimen Nos. 4–6 are comparative examples.

EXAMPLE 2

In accordance with the compositions shown in Table 2, raw material powders similar to those employed in Example 1 were mixed, dried and formed in a similar manner to Example 1, respectively. The resulting green compacts were sintered at 1650° C. for 5 hours in a 2-atm N$_2$ gas atmosphere, followed by HIP at 1600° C. for 1 hour in a 1000-atm N$_2$ gas atmosphere. The sintered bodies so obtained were evaluated in a similar manner to Example 1. The results are summarized in Table 2.

TABLE 2

| Specimen No. | Composition of additives (wt. %) | | | | Porosity (%) | 3-Point bending strength | Hugoniot-elastic limit (HEL) (GPa) | Revolution number at cam follower breakage (rpm) |
| --- | --- | --- | --- | --- | --- | --- | --- | --- |
| | Y$_2$O$_3$ | Al$_2$O$_3$ | MgO | Si$_3$N$_4$ | | | | |
| 1 | 1.0 | 0.5 | 0.5 | Balance | 2.0 | 145 | 15.2 | 4250 |
| 2 | 5.0 | 2.0 | 1.0 | Balance | 0.3 | 145 | 20.5 | Not broken |
| 3 | 7.5 | 3.0 | 1.0 | Balance | 0.4 | 138 | 19.6 | Not broken |
| 4 | 10.0 | 4.0 | 1.0 | Balance | 0.5 | 115 | 17.3 | 4400 |
| 5 | 15.0 | 6.0 | 1.0 | Balance | 1.5 | 92 | 13.8 | 3950 |

TABLE 2-continued

| Speci-men No. | Composition of additives (wt. %) | | | | Porosity (%) | 3-Point bending strength | Hugoniot-elastic limit (HEL) (GPa) | Revolution number at cam follower breakage (rpm) |
| --- | --- | --- | --- | --- | --- | --- | --- | --- |
| | Y$_2$O$_3$ | Al$_2$O$_3$ | MgO | Si$_3$N$_4$ | | | | |
| 6 | 0.5 | 0.5 | 0.5 | Balance | 4.2 | 74 | 10.2 | 3800 |

Note: Specimen Nos. 5 and 6 are comparative examples.

EXAMPLE 3

The following materials were evaluated in a similar manner to Example 1.
1) Specimen No. 3 in Example 1.
2) A sintered AlN body obtained by adding 5 wt. % of yttrium oxide to commercial AlN powder (average particle size: 0.8 μm; oxygen content: 0.8 wt. %), forming the resultant powder mixture and then sintering the thus-obtained green compact at 1870° C. for 5 hours in a 1-atm N$_2$ atmosphere.
3) A composite ceramic material composed of LAS (Li$_2$O—Al$_2$O$_3$—SiO$_2$) glass as a matrix and 40 vol.% of uniaxially-oriented long alumina fibers ("Alusen", trade mark; thickness: 180 denier; product of DENKI KAGAKU KOGYO K.K.).

The results of the evaluation are summarized in Table 3.

TABLE 3

| Specimen No. | Porosity (%) | 3-point bending strength (kg/mm$^2$) | Hugoniot-elastic limit (HEL) (Gpa) | Revolution number at cam follower breakage (rpm) |
| --- | --- | --- | --- | --- |
| 1) | 0.2 | 155 | 21.5 | Not broken |
| 2) | 0.5 | 46 | 10.3 | 3650 |
| 3) | 0.5 | 25 | 12.8 | 4000 |

What is claimed is:
1. A sintered silicon nitride body suitable for use as a high impact material, comprising 80 to 98 wt % of silicon nitride and a sintering aid consisting of 1 to 10 wt % Y$_2$O$_3$, 0.5 to 4.0 wt % Al$_2$O$_3$, and 0.5 to 1.0 wt % MgO, said sintered silicon nitride body having a porosity not higher than 3%, a shock compressive elasticity limit (Hugonoit-elastic limit (HEL)) of at least 15 GPa, and a bending strength of at least 100 kg/mm$^2$.

* * * * *